US008010946B2

(12) United States Patent
Zaky et al.

(10) Patent No.: US 8,010,946 B2
(45) Date of Patent: Aug. 30, 2011

(54) APPARATUS FOR ANALYSING AND ORGANIZING ARTIFACTS IN A SOFTWARE APPLICATION

(75) Inventors: Essam Zaky, Menlo Park, CA (US); Sami Ben-Romdhane, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1051 days.

(21) Appl. No.: 11/083,644

(22) Filed: Mar. 18, 2005

(65) Prior Publication Data

US 2006/0212843 A1 Sep. 21, 2006

(51) Int. Cl.
G06F 9/44 (2006.01)
(52) U.S. Cl. .......................... 717/120; 717/110; 717/111
(58) Field of Classification Search .................. None
See application file for complete search history.

(56) References Cited

U.S. PATENT DOCUMENTS

| | | | |
|---|---|---|---|
| 6,305,008 B1* | 10/2001 | Vaidyanathan et al. ...... | 717/111 |
| 6,373,502 B1* | 4/2002 | Nielsen .......................... | 715/708 |
| 7,322,024 B2* | 1/2008 | Carlson et al. ................ | 717/120 |
| 7,480,897 B2* | 1/2009 | Reinhardt et al. ............ | 717/120 |
| 2002/0166111 A1* | 11/2002 | Basheer ........................ | 717/120 |
| 2002/0198873 A1* | 12/2002 | Chu-Carroll ...................... | 707/3 |
| 2003/0154462 A1* | 8/2003 | Kumagai ...................... | 717/120 |
| 2003/0182651 A1* | 9/2003 | Secrist et al. ................. | 717/120 |
| 2005/0076328 A1* | 4/2005 | Berenbach et al. ........... | 717/104 |
| 2005/0081189 A1* | 4/2005 | Krasikov et al. .............. | 717/123 |

OTHER PUBLICATIONS

Cook et al. An Extensible Framework for Collaborative Software Engineering. Proceedings of the Tenth Asia-Pacific Software Enginering Conference, 2003, pp. 290-299.Retrieved on [Dec. 31, 2009].Retrieved from the Internet:URL<http://ieeexplore.ieee.org/stamp/stamp.jsp?arnumber=01254383.*
Reeves et al. Moomba—A Collaborative Environment for Supportng Distributed Extreme Programming in Global Software Development, LNCS, 2004, vol. 3092 pp. 38-50, Retrieved on [Jun. 29, 2011], Retrieved from the Internet:URL<http://www.springerlink.com/content/hlpxh3fn8e639e4a/fulltext.pdf>.*
Nentwich et al. Flexible Consistency Checking, ACM Transactions on Software Engineering and Methodology, Jan. 2003, p. 28-63, Retrieved on [Jun. 29, 2011] Retrieved from the Internet: URL<http://delivery.acm.org/10.1145/840000/839271/p28nentwich.pdf?ip=151.207.242.4&CFID=31897553 &CFTOKEN=51733 862&_acm_=1309442229_ 76e3675e67743601e45aee253063f3c6>.*
Hyman, Michael et al., "Visual C++ for Dummies", IDG Books Worldwide, Inc. Foster City, CA, USA 1998, pp. v, vi, 39-41, 47, 48 and 75-93.
International Search Report, International application No. PCT/US06/09801, May 16, 2007, 3 pages.
Written Opinion of the International Searching Authority, International application No. PCT/US06/09801, May 16, 2007, 7 pages.
Enrique Serrano Valle, "Eclipse Tutorial" [Online], Oct. 17, 2004, XP002498609.
Supplementary European Search Report, dated Oct. 28, 2008.

* cited by examiner

*Primary Examiner* — Thuy Dao
*Assistant Examiner* — Cheneca Smith
(74) *Attorney, Agent, or Firm* — Squire, Sanders & Dempsey (US) LLP

(57) ABSTRACT

In one embodiment, the invention provide a method comprising: generating a user interface to allow a user to make an input relating to a first component of an application; and if the input is related to an artifact, then presenting selected information about the artifact to the user. In another embodiment, invention provides a method comprising: collecting information about artifacts referenced by a statement in a first component of an application; and outputting run-time data for each artifact referenced by the statement to facilitate debugging of the first component.

18 Claims, 21 Drawing Sheets

```
                                                        ┌116
┌─────────┬────────────────┬──────────────┬────────────────────────┐
│home.jsp │*shoppingCart.jsp│ OrderItem.java│ CheckoutPaymentForm.java x│
├─────────┴────────────────┴──────────────┴────────────────────────┤
│  * @return the card number                                        ▲
│  */                                                               │
│  public String getCardNumber()                                    │
│  {                                                                │
│  ┌──────────────────────────┐                                     │
│  │  return this.cardNumber; │                                     │
│  └──────────────────────────┘                                     │
│  }                                                                │
│  /**                                                              │
│  * sets the expiration month                                      │
│  *                                                                │
│  * @param expirationMonth the expiration month                    │
│  */                                                               │
│  public void setExpirationMonth ( String expirationMonth)         │
│  {                                                                │
│      this.expirationMonth = expirationMonth;                      │
│  }                                                                │
│  /**                                                              │
│  * gets the expiration month                                      │
│  *                                                                │
│  * @return the expiration month                                   │
│  */                                                               │
│  public String getExpirationMonth()                               │
│  {                                                                │
│      return this.expirationMonth;                                 │
│  }                                                                │
│  /**                                                              │
│  * sets the expiration year                                       │
│  *                                                                │
│  * @param expirationYear the expiration year                      │
│  */                                                               │
│  public void setExpirationYear ( String expirationYear)           │
│  {                                                                │
│      this.expirationYear = expirationYear;                        │
│  }                                                                │
│  /**                                                              │
│  * gets the expiration year                                       │
│  *                                                                ▼
└───────────────────────────────────────────────────────────────────┘
```

FIG. 13

| home.jsp | *shoppingCart.jsp | OrderItem.java | CheckoutPaymentForm.java x |

```
<td width="110" height="20"><font face="Verdana" size="1"><bean:message key="copayment.cctype.text
<td width="530" height="20"
<html:select property="paymentMethod" value="1:VISA"
  <html:option value="1:VISA">Visa</html:option>
  <html:option value="2:MC">Mastercard</html:option>
  <html:option value="3:AMEX">American Express</html:option>
  <html:option value="4:DCARD">Discover Card</html:option>
<html:select>
</td>
</tr>
<tr>
<td width="110" heightt="20"><font face="1"><bean:message key="copayment.ccnumber.te
<td width="530" height="20"><html:text property=" " size="16" maxlength="16" />
</td>
</tr>
<tr>
<td width="110" height="20"><font face="Verdana" value="        ment.ccexpmonth.
<td width="530" height="20">
<html:select property="expirationMonth" value="
  <html:option value="01">01</html:option>
  <html:option value="02">02</html:option>
  <html:option value="03">03</html:option>
  <html:option value="04">04</html:option>
```

— 118

— 120

CardNumber
expirationMonth
expirationYear
paymentMethod

— 122

| Design/Source | Design | Source |

FIG. 14

| home.jsp | *shoppingCart.jsp | OrderItem.java | CheckoutPaymentForm.java x |

```
<td width="110" height="20"><font face="Verdana" size="1"><bean:message key="copayment.cctype.text
<td width="530" height="20">
<html:select property="paymentMethod" value="1:VISA"
    <html:option value="1:VISA">Visa</html:option>
    <html:option value="2:MC">Mastercard</html:option>
    <html:option value="3:AMEX">American Express</html:option>
    <html:option value="4:DCARD">Discover Card</html:option>
</html:select>
</td>
</tr>
<tr>
<td width="110" height="20"><font face ="Verdana" size="1"><bean:message key="copayment.ccnumber.te
<td width="530" height="20"><html:text property="CardNumber" size="16" maxlength="16" />
</td>
</tr>
<tr>
<td width="110" height="20"><font face="Verdana" size="1"><bean:message key="copayment.ccexpmonth.
<td width="530" height="20">
<html:select property="expirationMonth" value="01"
    <html:option value="01">01</html:option>
    <html:option value="02">02</html:option>
    <html:option value="03">03</html:option>
    <html:option value="04">04</html:option>
```

| Design/Source | Design | Source |

FIG. 15

| home.jsp | *shoppingCart.jsp | OrderItem.java | CheckoutPaymentForm.java x |

```
* @return the card number
*/
public String get Credit CardNumber()        130
{
    return this.CardNumber;
}
/**
* sets the expiration month
*
* @param expirationMonth the expiration month
*/
public void setExpirationMonth ( String expirationMonth )
{
    this.expirationMonth = expirationMonth;
}
/**
* gets the expiration month
*
* @return the expiration month
*/
public String getExpirationMonth()
{
```

| Problems x | Tasks | Console | JSP Variables | Struts Exceptions | Search | | |
|---|---|---|---|---|---|---|---|
| 1 error, 2 warnings, 0 infos ||||||||
| Description | | | | Resource | In Folder | Location ||
| The method getCardNumber() is undefined for the type CheckoutPay... | | | | CheckoutPaymentActio.. | sonic/site/WEB- INF/src/java/ com/hp/mw/samples/st.. | Line 60 ||
| The Field "cardNumber" is undefined for the type "com.hp.mw.samples... | | | | checkoutPayment.jsp | sonic/site | ||
| The Field "cardNumber" is undefined for the type "com.hp.mw.samples... | | | | Validation.xml | sonic/site/WEB-INF | ||

| home.jsp | *shoppingCart.jsp | OrderItem.java | CheckoutPaymentForm.java x |

```
<td width="110" height="20"><font face="Verdana" size="1"><bean:message key="copayment.cctype.text
<td width="530" height="20">
<html:select property="paymentMethod" value="1:VISA"
    <html:option value="1:VISA">Visa</html:option>
    <html:option value="2:MC">Mastercard</html:option>
    <html:option value="3:AMEX">American Express</html:option>
    <html:option value="4:DCARD">Discover Card</html:option>
<html:select>
</td>
</tr>
<tr>
<td width="110" heightt="20"><font face="Verdana"  size="1"><bean:message key="copayment.ccnumber.te
The field "cardNumber" is undefined for the type "com.hp.mw.samples.struts.storefront.action.
CheckoutPayment ber" size="16" maxlength="16" />
</td>
</tr>
<tr>
<td width="110" height="20"><font face="Verdana"  size="1"><bean:message key="copayment.ccexpmonth.
<td width="530" height="20">
<html:select property="expirationMonth" value="01"
    <html:option value="01">01</html:option>
    <html:option value="02">02</html:option>
    <html:option value="03">03</html:option>
    <html:option value="04">04</html:option>
```

Design/Source | Design | Source

FIG. 19

APPARATUS FOR ANALYSING AND ORGANIZING ARTIFACTS IN A SOFTWARE APPLICATION

FIELD OF THE INVENTION

Embodiments of the invention relate to the field of software development in general, and in particular to programming tools.

BACKGROUND

Today, it is common for a software application to have several components where not all of the components are written in the same language or use the same technology. For example, a software application may have components written in Java, C++, XML (extensible markup language), HTML (hypertext markup language), etc. and may further include components based on different technologies such as Java servlets, JavaBeans, Java Server Pages, Enterprise JavaBeans (EJBs), etc. Often, it is the case that not all of the components are written by the same programmer or by the same programming team. The components may even be part of a framework that facilitates application development. A framework provides a specification or implementation (for example, a collection of classes) as a general solution to a problem. An example of a framework is the Struts framework which provides components to facilitate the development of Web applications. Typically, to develop a software application using a framework, a developer would add components to the framework so that the added components together with the components of the framework implement the logic and composite functions required by the software application.

Given that in developing a software application, a developer may have to use components written by others, often in a different language, it is highly likely that code written by the developer will include statements or references to artifacts. As used herein, the term "artifact" refers to any body of code, component or construct defined outside a referencing body of code and existing as a separate entity independently of the referencing body of code. Often, artifacts are created before the referencing code, and are written in a language different from the language of the referencing code. For example, when creating a Java Server Page for a web application, a developer may reference an artifact called "VerifyCardNumber", which includes logic to verify a credit card number of a consumer during an online purchasing transaction. The artifact "VerifyCardNumber" may be part of a framework, and as such will predate the code being written for the Java Server Page, and may be in a different language, for example Java or C++.

In the above described methodology for software development, maintaining semantic and syntactic consistency may be difficult and requires detailed knowledge of each artifact that is used.

If consistency errors between the artifacts are not detected during the creation or modification of source code, then the only alternative is to detect them after the compiled artifacts are deployed and at runtime. The consistency errors may manifest themselves in several ways ranging from minor errors to catastrophic failure of an application. It is also possible for these errors to remain undetected for a long time causing the application to fail at inopportune times, potentially causing grave economic consequences.

SUMMARY OF THE INVENTION

According to a first aspect of the invention, a method comprising generating a user interface to allow a user to make an input relating to a first component of an application; and if the input is related to an artifact, then presenting selected information about the artifact to the user, is provided.

According to a second aspect of the invention, a method comprising collecting information about artifacts referenced by a statement in a first component of an application; and outputting runtime data for each artifact referenced by the statement to facilitate debugging of the first component, is provided.

According to a third aspect of the invention, a method comprising, for each component in an application, collecting information about the artifacts that occur therein; and storing the information in a database, is provided.

Other aspects of the invention will be apparent from the detailed description below.

BRIEF DESCRIPTION OF THE DRAWINGS

FIG. 13 shows an example of Java methods corresponding to the Java source code of FIG. 12;

FIG. 14 shows representative code for the JSP source code of FIG. 12;

FIG. 15 shows the JSP source code of FIG. 12, after a developer has selected the correct method, in accordance with one embodiment of the invention;

FIGS. 18 and 19 show how embodiments of the invention provide real-time consistency analysis.

DETAILED DESCRIPTION

Figure 1:
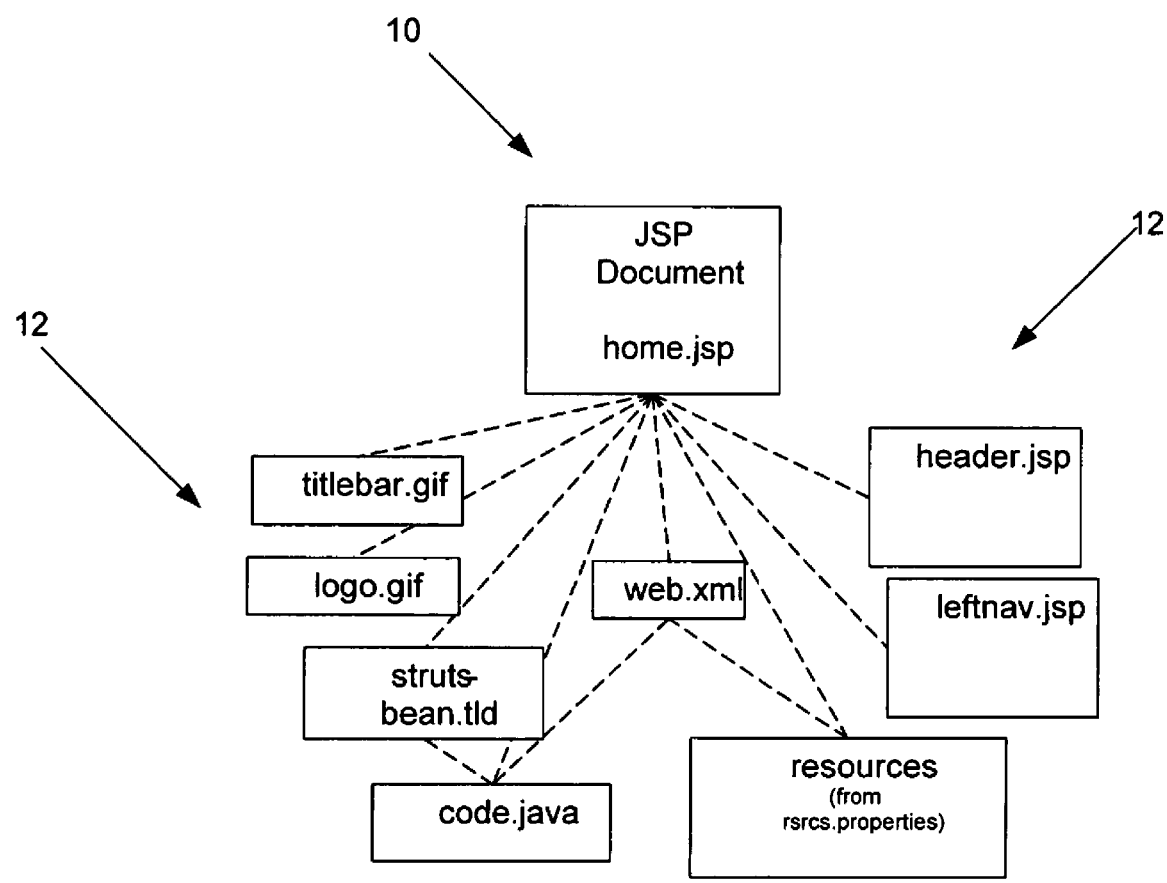
FIG. 1 shows a component of an application whose source code includes references to artifacts.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In one embodiment, the invention provides an apparatus to analyze relationships amongst and between related artifacts to determine if they are consistent with each other, even if the artifacts are implemented in different programming languages. The apparatus may be configured for an arbitrary set of documents and artifacts based on an application type (e.g. .NET, J2EE). In another embodiment, the apparatus may be configured to analyze the artifacts within a particular architecture or framework such as the Microsoft Active Server Pages, or the Apache Open Source Struts framework. The apparatus is extensible, and can be extended to support additional languages or a completely different architectures or frameworks.

Advantageously, the apparatus provides dependency and consistency analysis across all artifacts and documents types within an application type. In one embodiment, document analysis may be performed as a given artifact is modified within an editor. Once an artifact is edited, immediate feedback is provided through various indicators (e.g., console messages, text highlight, messages that appear when the mouse is over an offending statement). The analysis checks for syntax errors as well as semantic errors in each direction of a relationship. That is, errors that result from referencing a non-existent artifact (e.g., a miss-named interface reference) or changes to an artifact that has one or more dependents (e.g., changing an interface used by other artifacts within the application).

The apparatus provides syntactic and semantic completion across all artifacts and document types within an application type based on information about the artifacts and their relationships within and across documents. In one embodiment, the apparatus provides candidate keywords and legal names for referenced objects. For example in J2EE, when editing a JSP with references to Java Class interfaces, a list of candidate method names for the class are provided in the editor.

Referring now to FIG. 1 of the drawings, reference numeral 10 generally indicates a component of an application. The component 10 is representative of components whose source code includes references to artifacts. For example, in the case of a web application, the component 10 may be a document in the form of a Java Server Page (JSP) entitled, for example, "home.jsp" and may include references to artifacts 12 that exist independently of the component 10. As will be seen from FIG. 1 of the drawings, some of the artifacts 12 are written in languages/technologies that are different from the Java Server Page technology of the component 10.

Figure 2:
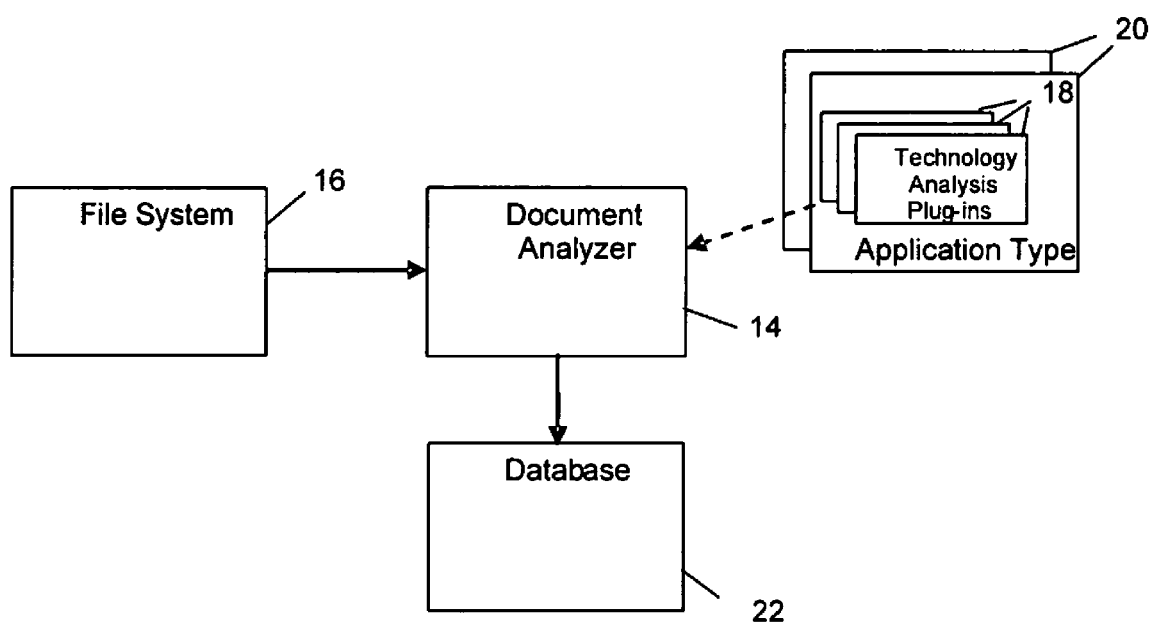
FIG. 2 shows a document analyzer and a database in accordance with one embodiment of the invention.

In one embodiment of the invention, an application comprising a plurality of components/documents 10, each referencing a set of artifacts 12 within a container or framework for the application, is analyzed in order to determine information about the artifacts. Accordingly, in one embodiment, a document analyzer 14 is provided as can be seen in FIG. 2 of the drawings. Referring to FIG. 2, the document analyzer 14 analyses artifacts as the artifacts are created. In one embodiment, the document analyzer 14 may analyze artifacts as the artifacts are being modified. The document analyzer may import artifacts for analysis from a file system 16. In one embodiment, the document analyzer 14 uses a collection of technology plug-ins 18, each of which corresponds to a particular application type 20. Generally, an application type corresponds to a deployment container such as J2EE or .Net. Each technology plug-in 18 possesses information about the artifacts that comprise a document and the rules that determine the consistency of the artifacts within and between the documents 10. The technology plug-ins 18 are described in more detail with reference to FIG. 5 below.

In one embodiment, a database 22 is provided in order to store the information about the artifacts that was generated as a result of analysis performed by the document analyzer 14.

Figure 3:
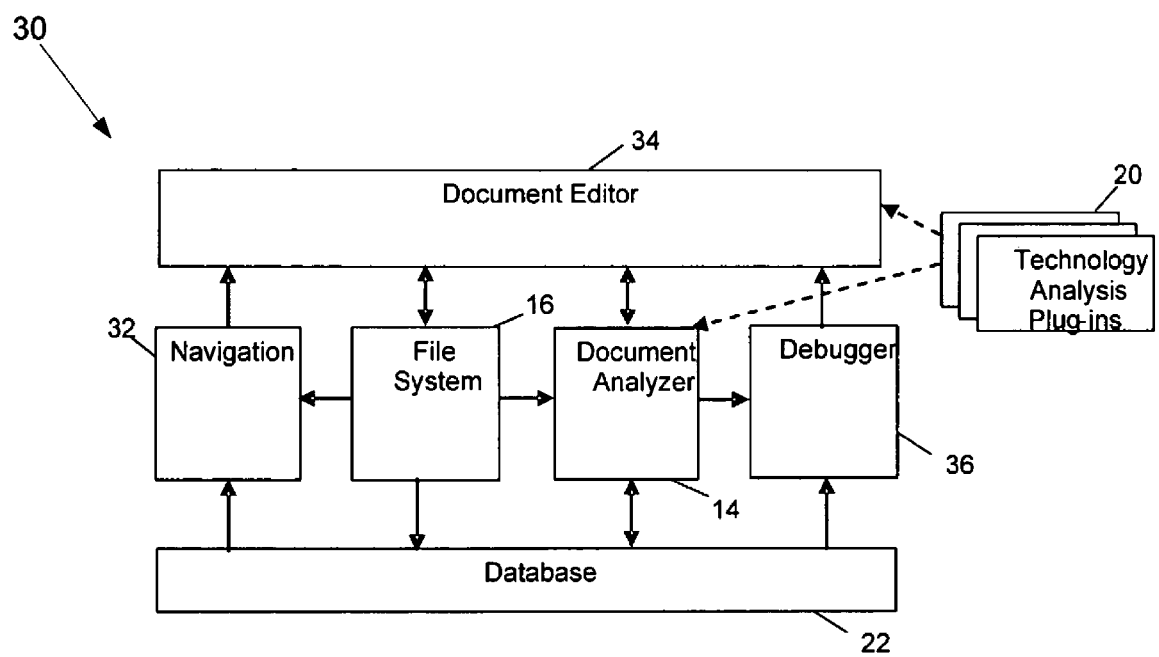
FIG. 3 shows an apparatus, in accordance with one embodiment of the invention, in the form of an interactive development environment (IDE)

FIG. 3 shows an apparatus, in accordance with one embodiment of the invention, in the form of an interactive development environment (IDE) 30. In addition to the components described with reference to FIG. 2 of the drawings, the IDE 30 includes a navigation component or navigator 32, a document editor 34, and a debugger 36. In one embodiment, a user interacts with the IDE 30, through the document editor 34. If the user is creating a new artifact, the document analyzer 14 checks the artifact for syntax and semantic errors and creates an artifact record (or records) in the database 22. If the artifact already exists, then changes are checked by the document analyzer 14 and any errors that are detected are displayed in the document editor 34. If the user saves the artifact then the artifact is stored or updated in the file system 16 and an artifact record is added to or updated in the database 22.

Navigation

In one embodiment, the IDE 30 supports the ability to traverse relationships between artifacts. In this embodiment, in response to commands/input received from a user/developer via the document editor 34 to view a particular artifact, the navigator 32 retrieves the artifact's record from the database 22 to determine which file(s) to retrieve from the file system 16 and display in the document editor 34.

Figure 4:
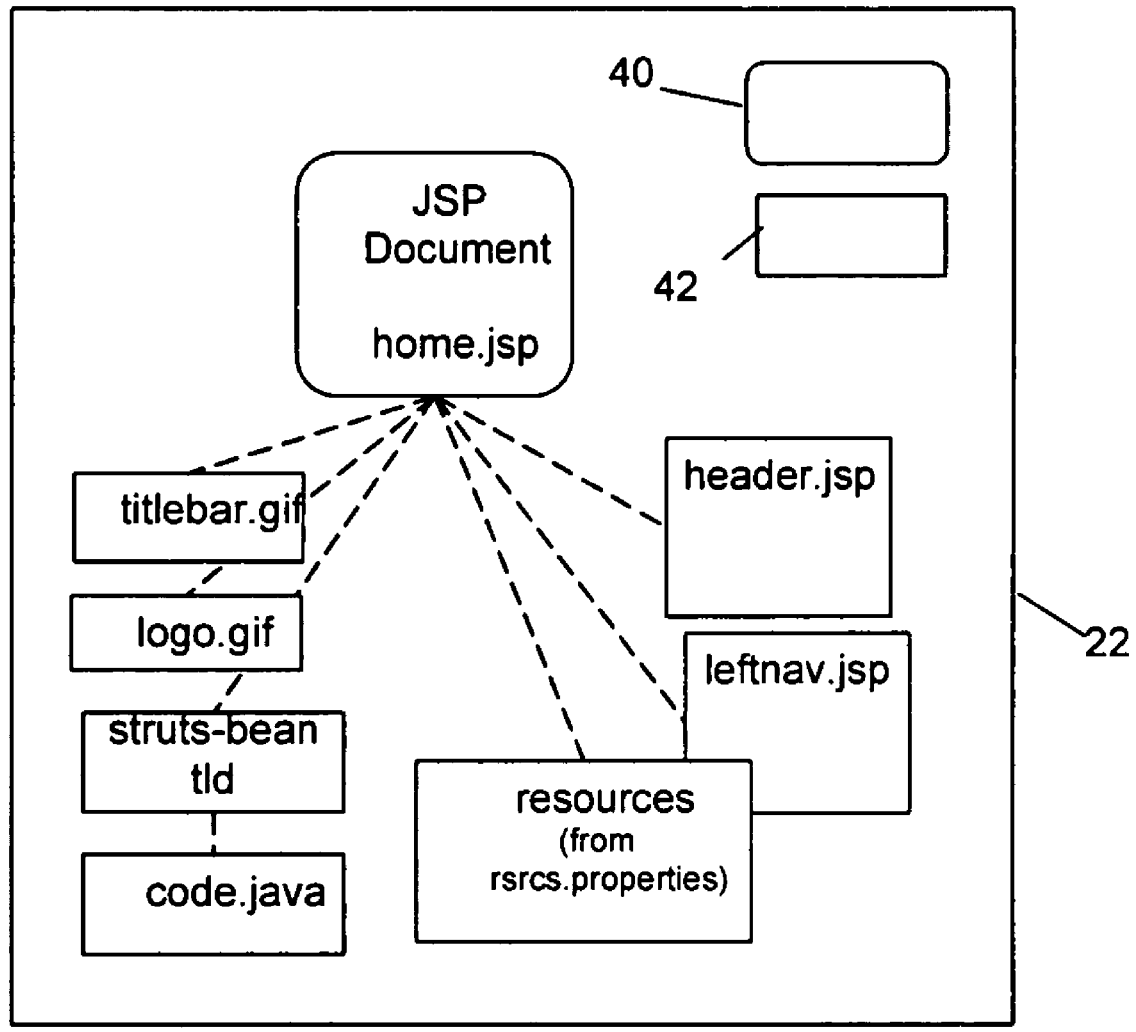
FIG. 4 shows the artifacts of a representative document that can be analyzed in accordance with one embodiment of the invention.

In one embodiment, for the J2EE application type, a Java Server Page (JSP) document 40 within the database 22 (see FIG. 4 of the drawings), is comprised of and references several artifacts 42. The artifacts 42 may include the document's JSP file (e.g., home.jsp), one or more included JSP files (e.g., a header header.jsp, a navigation JSP leftnav.jsp), some image files (e.g., titlebar.gif and logo.gif), and resource text from a properties file (rsrcs.properties). The JSP document 40 may be displayed in the document editor 34. Any navigation commands to view a particular artifact 42 issued by a user/developer and received by the IDE 30 causes the navigator 32 to query the database 22 and to retrieve a reference to the artifact 42 from the database 22. The navigator 22 then uses the reference to retrieve the artifact from the file system 16. The end result is that the particular artifact 42 is displayed in the document editor 34. Because all the artifact relationships are maintained in the database 22, the navigator 32 can traverse relationships that span disparate technologies and different layers of an architecture.

Technology Analysis Plug-Ins

Figure 5:
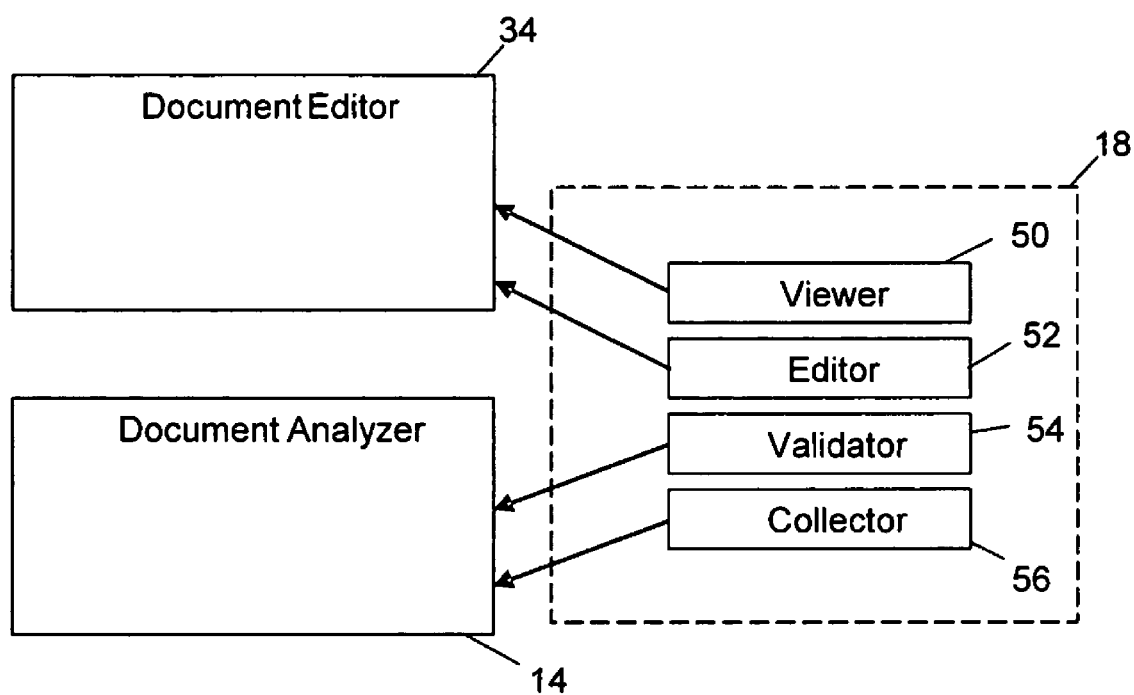
FIG. 5 illustrates a technology plug-in, in accordance with one embodiment of the invention.

As described above, the document analyzer 14 utilizes technology analysis plug-ins 18 to provide the logic to analyze and display artifacts. FIG. 5 of the drawings illustrates the components of the technology analysis plug-ins 18, in accordance with one embodiment of the invention. FIG. 5 also shows how the technology plug-ins 18 interact with the document analyzer 14 and the document editor 34, in accordance with one embodiment. Referring to FIG. 5, it will be seen that each technology plug-in 18 includes a viewer 50, an editor 52, a validator 54, and a collector 56. The viewer 50 and the editor 52 provide additional technology-specific logic to the document editor 34. For example, the viewer 50 may show a diagram rather than text, depending upon the technology and how the viewer 50 for the technology plug-in 18 corresponding to that technology is implemented. The validator 54 provides the rules to govern the syntax and semantic checking performed by the document analyzer 14. The collector 56 provides the apparatus to gather all the elements that comprise the artifact for the technology being analyzed.

Importing/Creating and Updating of a Database 22

Figure 6:
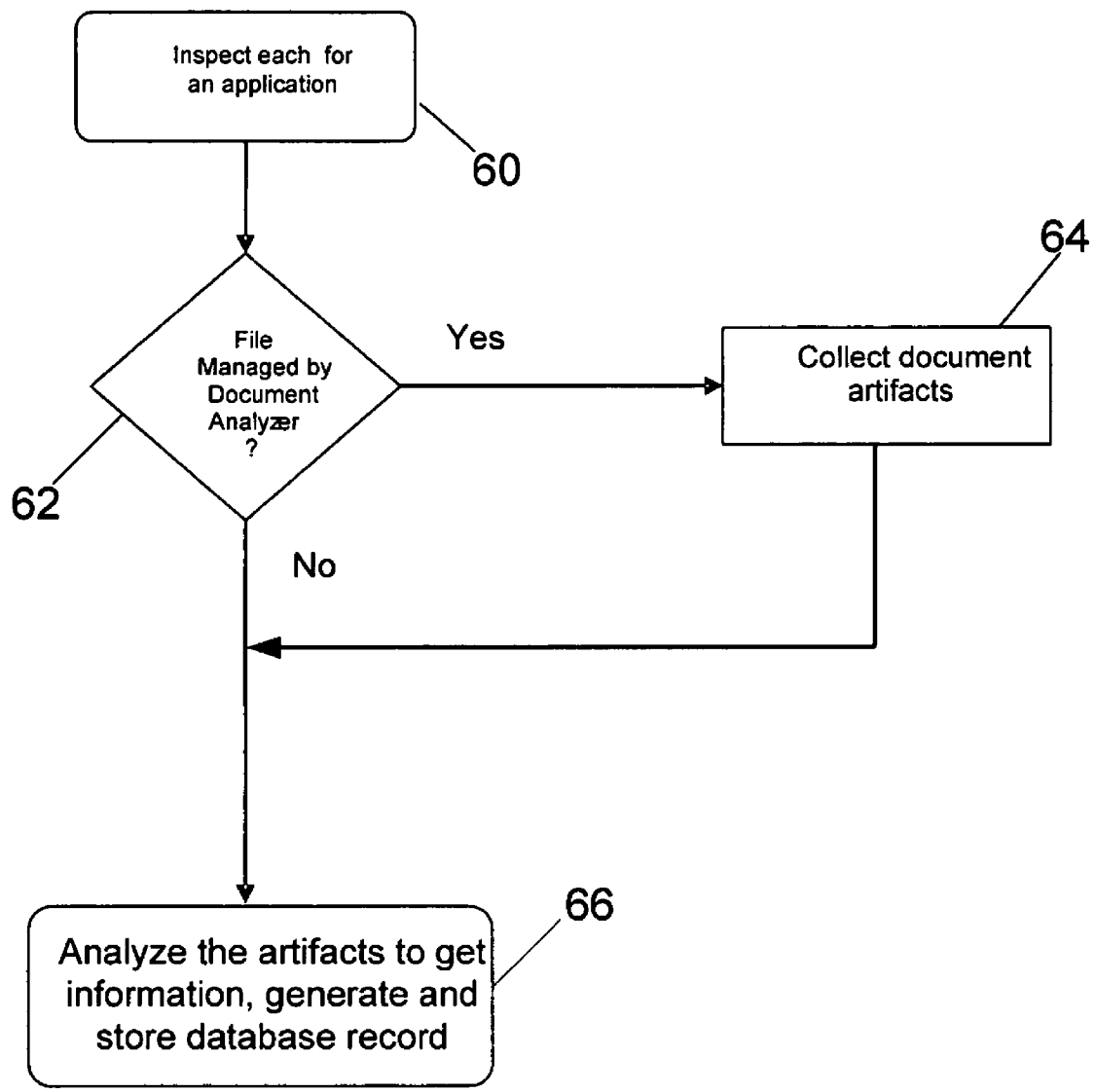
FIG. 6 shows a flow chart of operations performed by a document analyzer in accordance with one embodiment of the invention.
Figure 7:
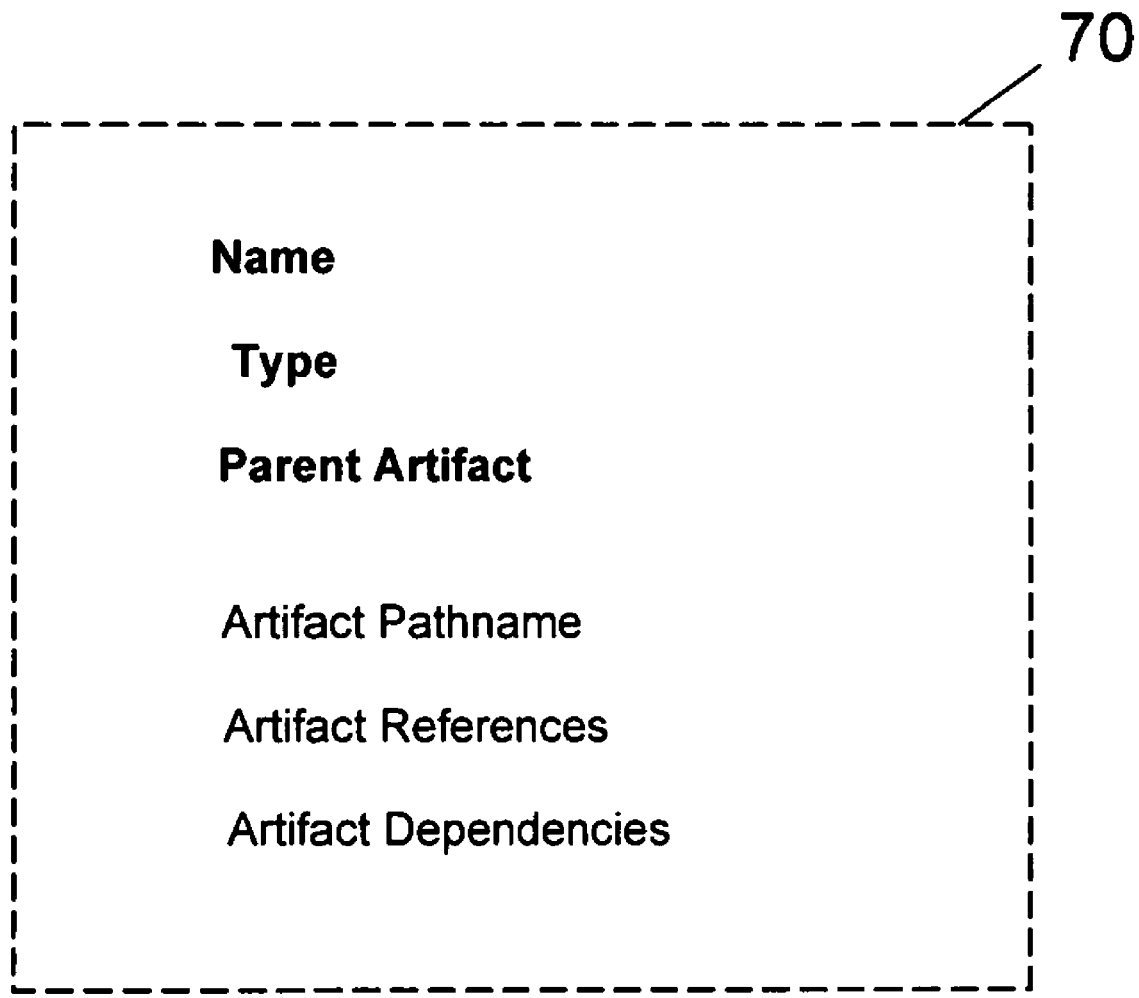
FIG. 7 shows an example of an artifact record in accordance with one embodiment of the invention.
Figure 8:
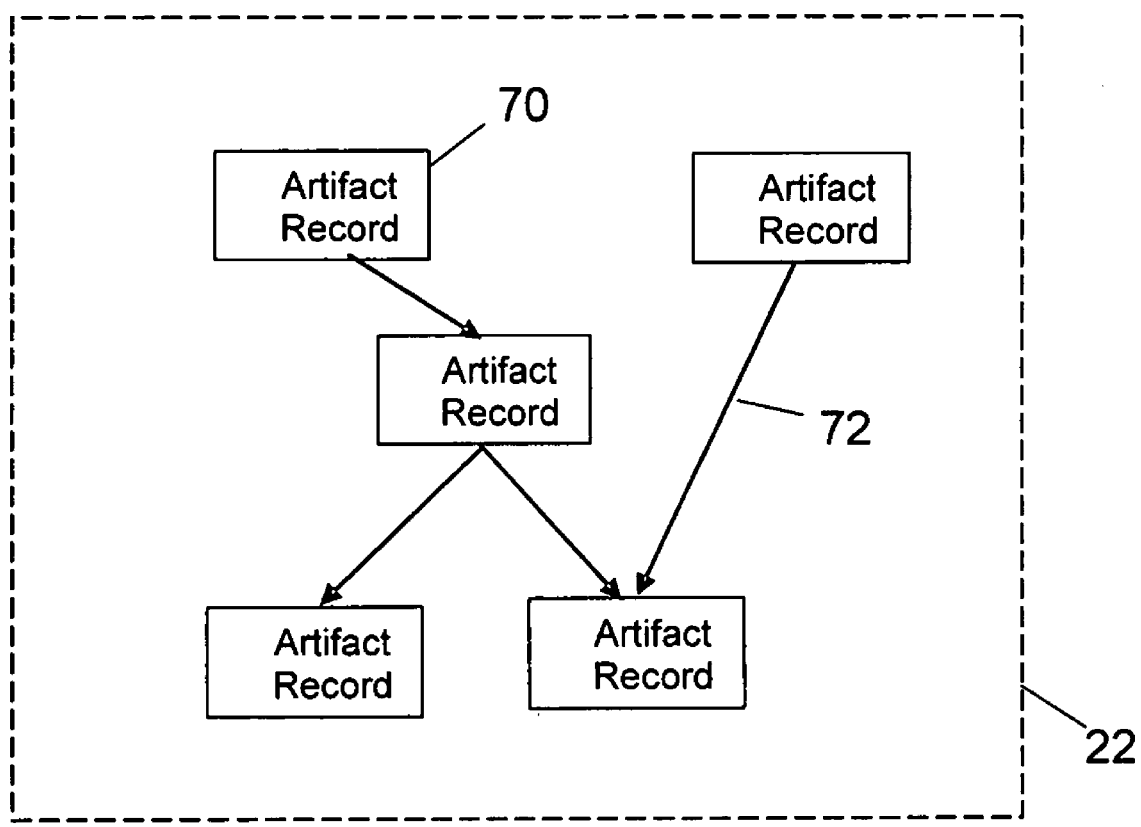
FIG. 8 shows a view of a database, in accordance with one embodiment of the invention, in which various artifact records may be seen.

FIG. 6 of the drawings shows a flow chart of operations performed by the document analyzer 14 in accordance with one embodiment of the invention. Referring to FIG. 6, in process 60, the document analyzer 14 inspects each file for an application stored in the file system 16 to determine if the file is one that is configured to be managed by the document analyzer 14. For example, some files are not managed by the document analyzer 14. Examples of files that may not be managed by the document analyzer 14 include image files e.g., in the JPEG format. If a file is managed by the document analyzer 14 then flow branches at 62 to process 64, wherein all artifacts related to that file are collected. In performing process 64, the document analyzer 14 uses the collector 56 of the appropriate technology plug-in 18. In process 66, the document analyzer 14 analyses the collected artifacts to determine information about the artifacts. In one embodiment of the invention, the information of the artifacts includes information such as artifact name, type, parent artifact, artifact pathname, artifact references, and artifact dependencies. In one embodiment, in process 66, the document analyzer 14 generates an artifact record comprising the artifact information. An example of such an artifact record 70 is shown in FIG. 7 of the drawings. In process 66, the document analyzer 14 stores each artifact record 70 in the database 22. FIG. 8 of the drawings shows a view of a database 22, in which the various artifact records 70 can be seen. In FIG. 8, the arrows 72 indicate dependency information between artifact records 70. In one embodiment of the invention the artifact record 70 provides the navigator 32, and the debugger 36, with the information they require to perform their respective functions.

The Debugger 36

In one embodiment, the debugger 36 uses the relationship/dependency information between artifacts to facilitate debugging of an artifact of one technology that depends upon an artifact of another technology. Similar to the navigator 32, the debugger 36 utilizes the database 22 to traverse or navigate to referenced artifacts. The debugger 36 also utilizes the document analyzer 14 to generate a user interface (UI) to allow a developer to view and edit an artifact including information such as global variables and their values that could only be determined as a result of maintaining a rich semantic understanding of the entire application. In accordance with the techniques disclosed herein, in one embodiment, the document analyzer 14 collects information about artifacts referenced by a statement in a first component (source code) of an application. Thereafter, the debugger 36 outputs run-time data for each artifact referenced by the statement to facilitate debugging of the first component. The debugger 36 is able to output the run-time data based upon information about each referenced artifact stored in the database 22.

Interactive—Live Analysis

Figure 9:
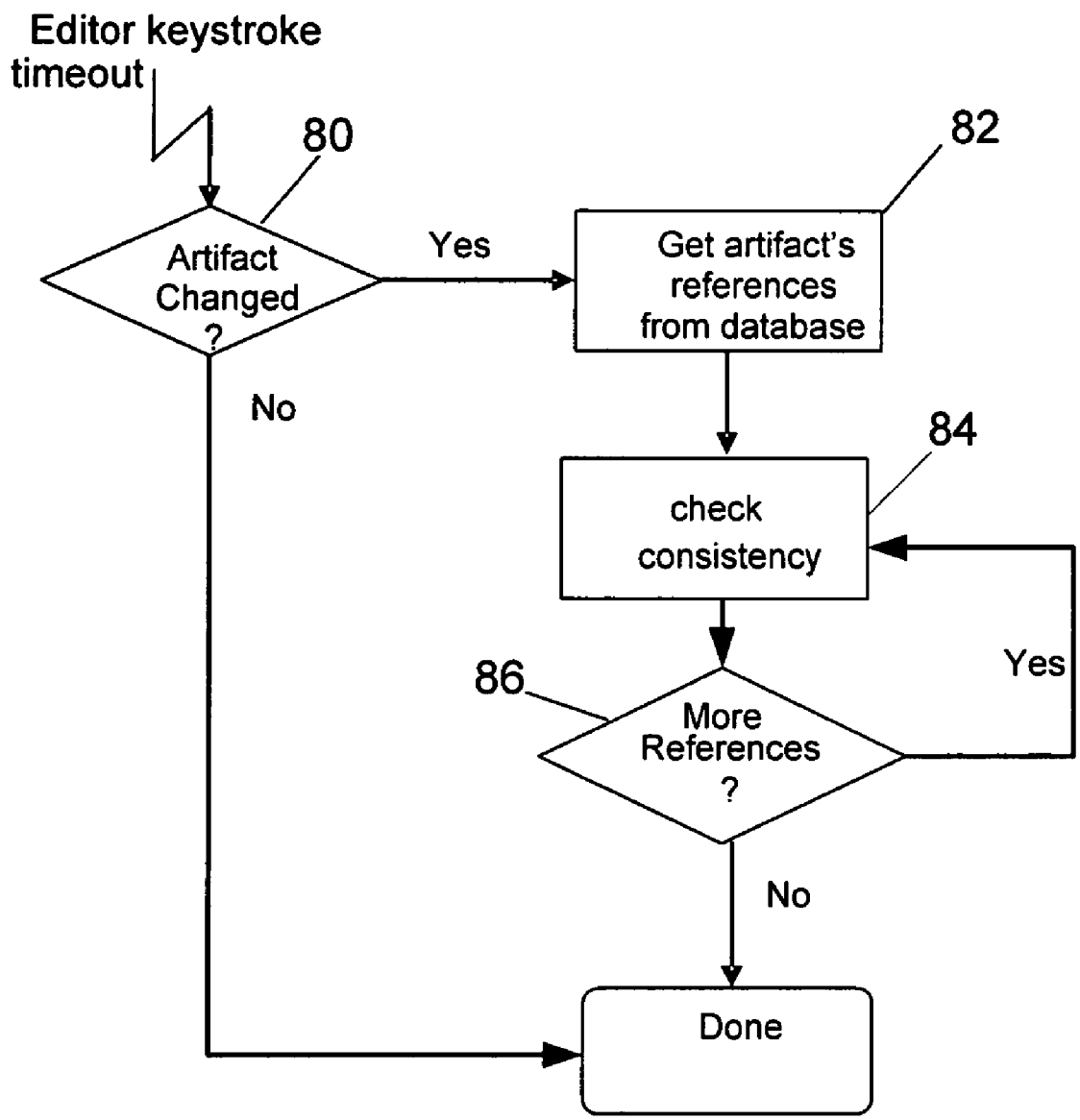
FIG. 9 shows a flow chart of operations, in accordance with one embodiment of the invention, for performing real-time analysis as artifacts are edited and changed.

FIG. 9 of the drawings shows a flowchart of operations, in accordance with one embodiment of the invention, for performing real-time analysis as artifacts are edited and changed. Referring to FIG. 9, when typing in the document editor 34 ceases, a time-out causes a real-time consistency check to be performed. In process 80, the document analyzer 14 determines whether or not the artifact being edited has changed. If the artifact has changed, the document analyzer 14 fetches all the artifact's by calling the Collector 56 to gather all the references from the database 22 for the relevant artifacts of the document in process 82. In process 84, the document analyzer 14 calls the validator 54 for the referenced artifact to check it for consistency and to log any errors. The document analyzer repeats processes 80, 82, and 84, until a check at 86 determines that there are no more references to be checked. When all the references have been checked, the analysis is complete and a consistency or error log can be displayed in a variety of ways including simply copying the error log to a console or highlighting the errors in the view of the artifact in the document editor 34.

Figure 10:
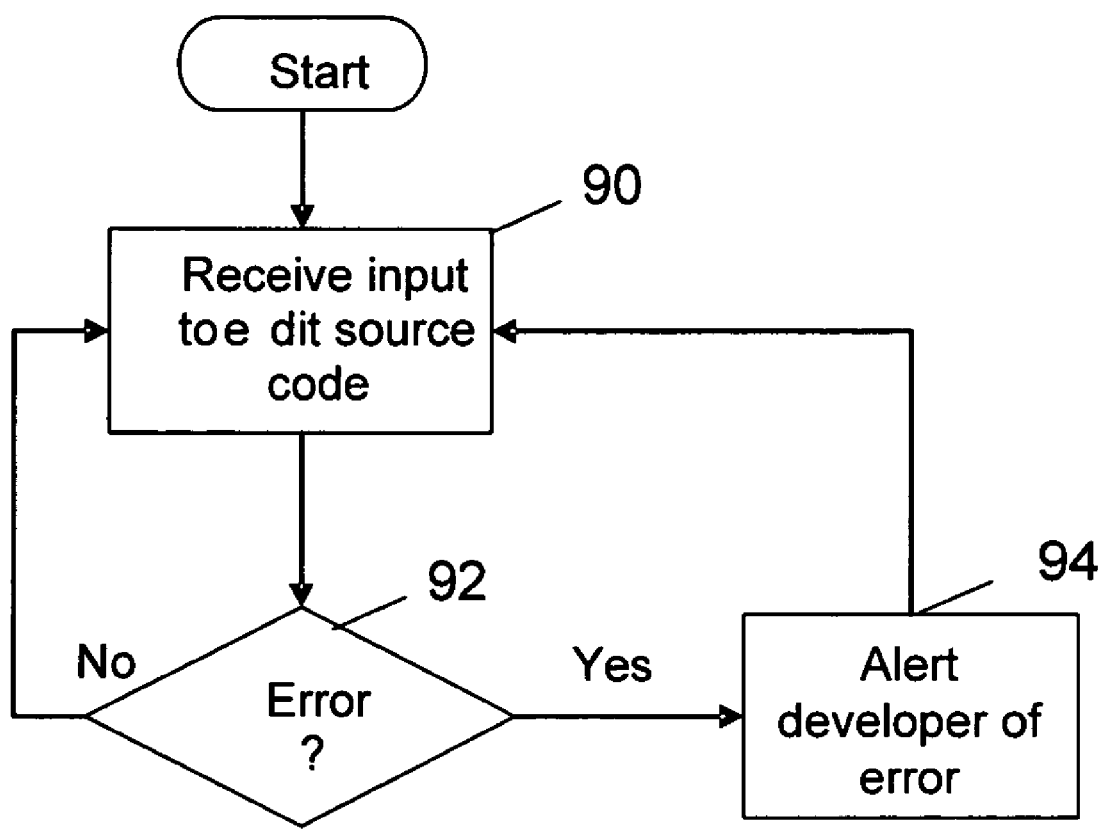
FIG. 10 illustrates a flow chart of operations performed by the IDE, in accordance with one embodiment of the invention, in order to provide the real-time consistency checking and validation.

FIG. 10 of the drawings illustrates a flowchart of operations performed by the IDE 30, in accordance with one embodiment of the invention, in order to provide real-time consistency checking and validation. Referring to FIG. 10, in process 90, the document editor 34 receives input to edit the source code for a component of an application being developed. In response to the input, and in accordance with the above described techniques, the document analyzer 14 performs a consistency check to ensure consistency between the source code and all artifacts referenced by the source code. If the consistency check reveals an error at 92, then in process 94 the developer is alerted of the error.

Figure 11:
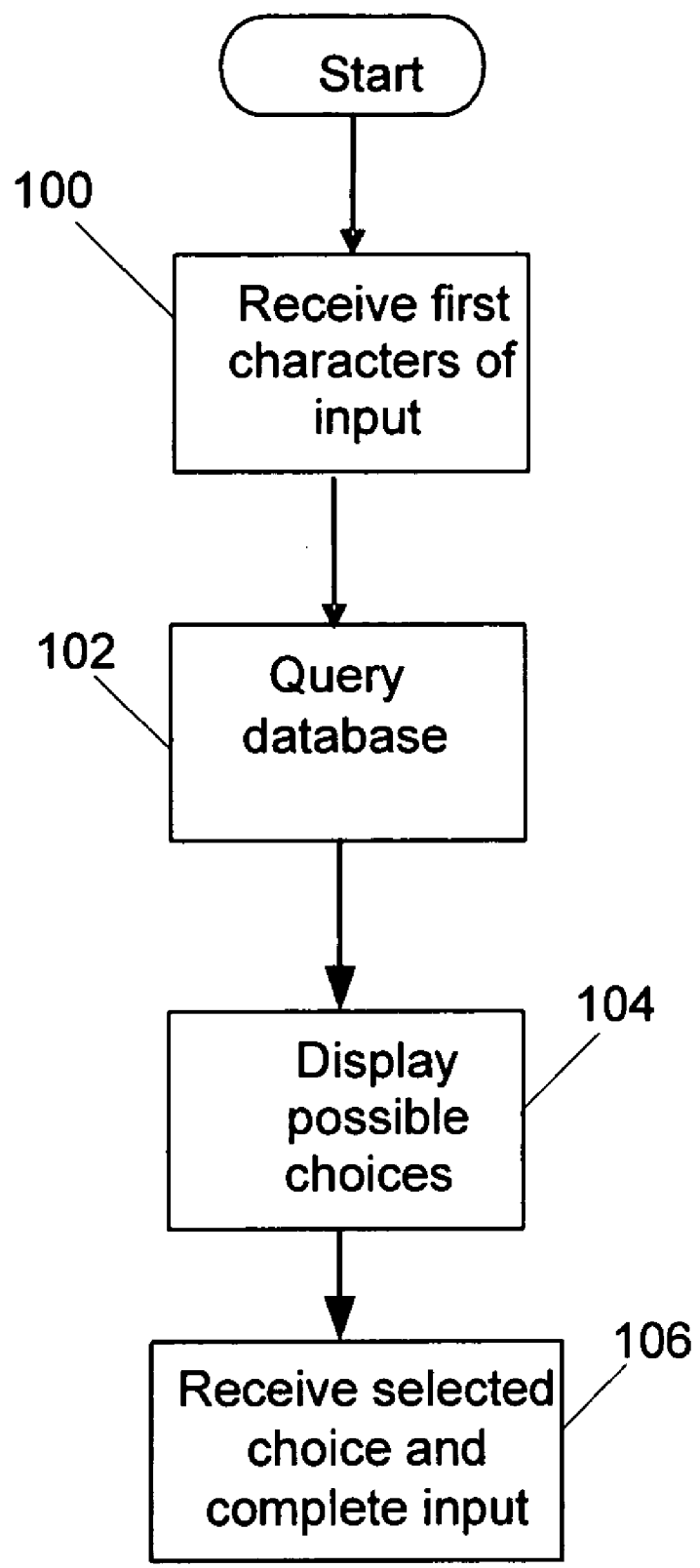
FIG. 11 illustrates a flow chart of operations performed by the IDE, in accordance with one embodiment of the invention, in order to assist a developer to make legal choices for a statement that references an artifact.

FIG. 11 of the drawings illustrates a flowchart of operations performed by the IDE 30, in accordance with the one embodiment of the invention, in order to assist a developer to make legal choices for a statement that references artifacts. Referring to FIG. 11 in process 100 the first characters of input related to an artifact and which are input by a developer is received. For example, the input maybe a variable name defined in the artifact. Based on the legal choices for the input given the artifact, in process 102, the document analyzer 14 queries the database 22 in accordance with the above described techniques and displays a list of possible choices for the input in process 104. In process 106, the developer's selected choice from the list is received and used to automatically complete the input.

Example

Figure 12:
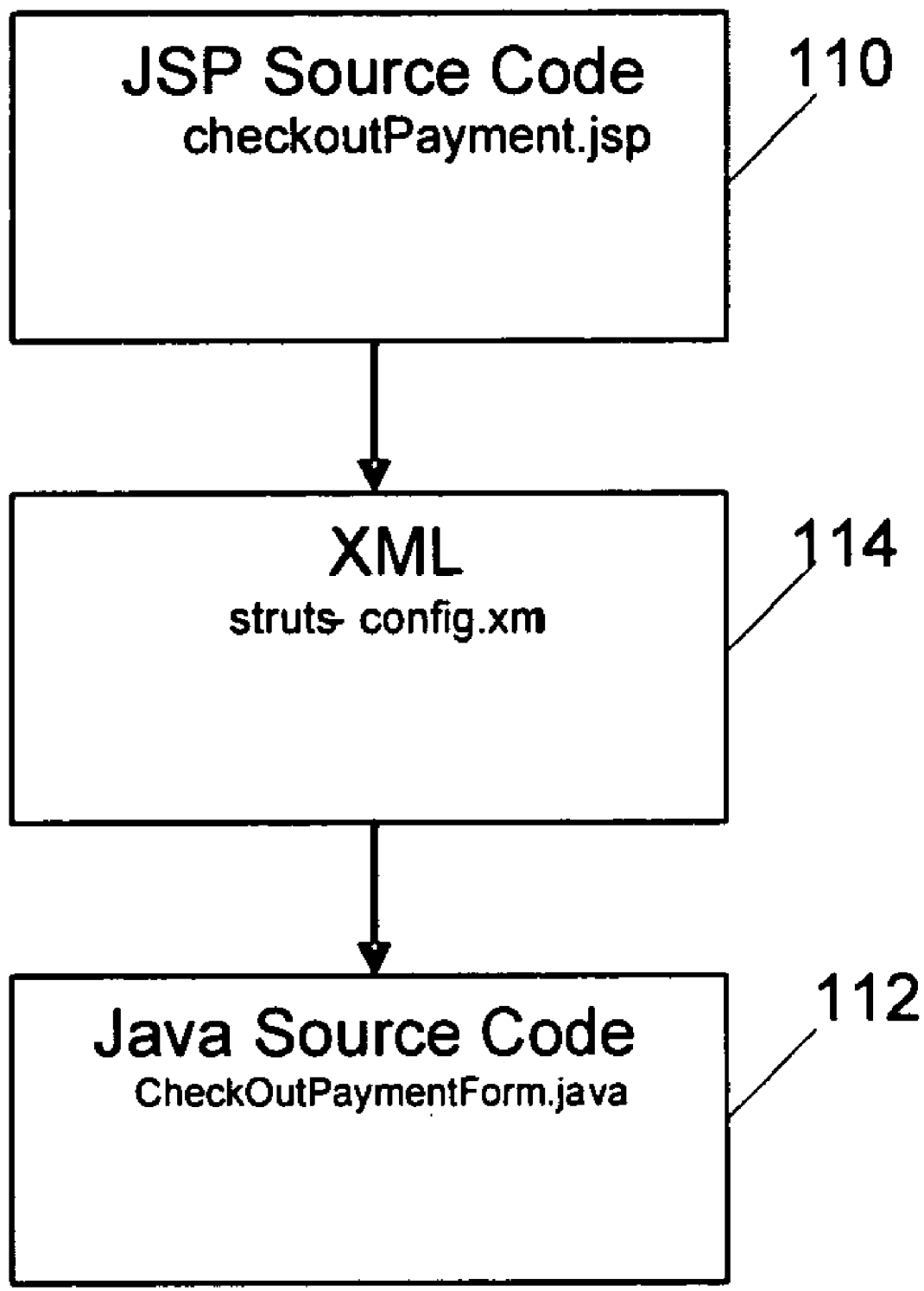
FIG. 12 illustrates how JSP source code is related to Java code via an XML configuration file.

An example of how embodiments of the invention may be used by a developer will now be described. Referring to FIG. 12 of the drawings a Java Server Page (JSP) comprises JSP source code 110 that references Java source code 112. The relationship between the JSP source code 110 and the Java source code 112 is defined in a XML configuration file 114.

FIG. 13 of the drawings shows a screenshot 116 in which an example of Java methods corresponding to the Java source code 112 for a credit card processing application can be seen.

FIG. 14 of the drawings shows representative code 118 for the JSP source code 110 corresponding to a user interface that collects and displays credit card information on a web page. The representative code 118 references a method written in Java to get a credit card number. The representative code 118 references this method in a JSP statement that sets a text property 120 to the value processed by the program written in Java. The analysis performed by embodiments of the invention and described above maintains information about the relationship between the JSP source code 110 and the Java source code 112 described by the XML configuration file 114. The applicable methods defined in the Java source code 112 may be displayed for example in the form of a drop-down list 122 to assist the developer in entering the correct method name. FIG. 15 of the drawings shows the JSP source code 110 after the developer has selected the proper method name from the list and has added it to the JSP statement 120.

Figure 16:
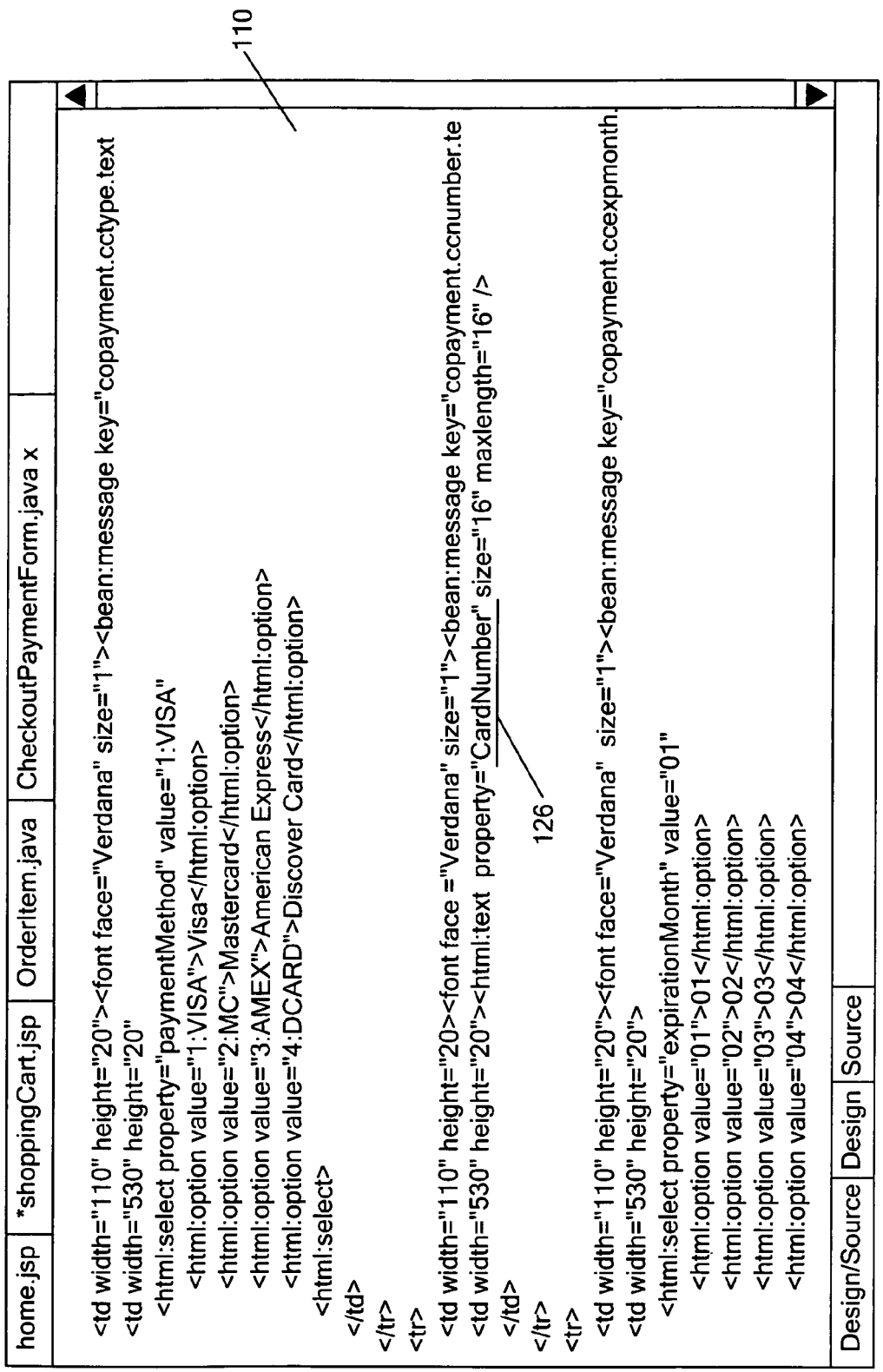
FIGS. 16 and 17 show how an embodiment of the invention may assist in navigating from the JSP source code of FIG. 12 to the Java source of FIG. 12.
Figure 17:
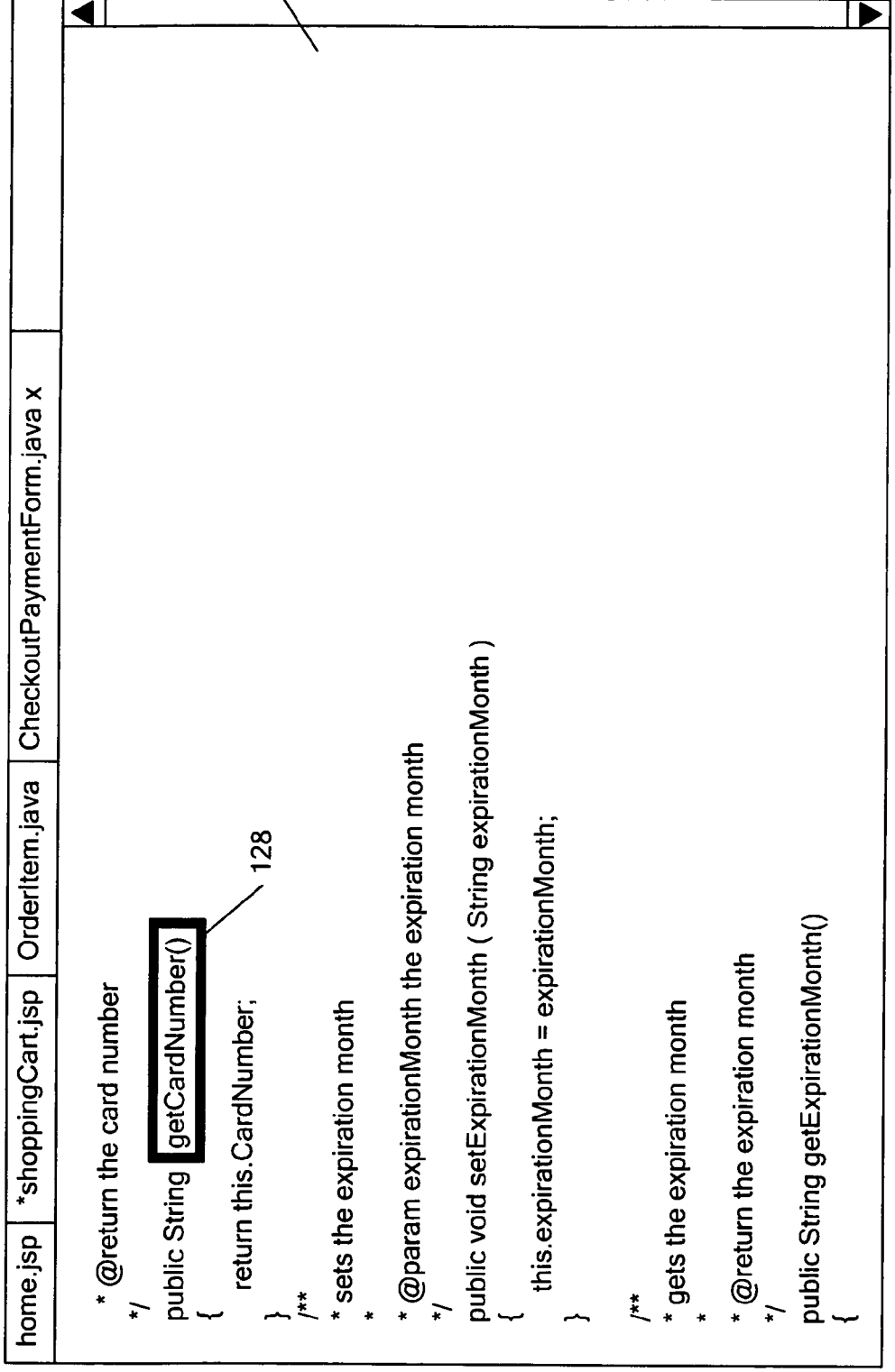

FIGS. 16 and 17 of the drawings show how embodiments of the invention may assist in navigating from the JSP source code 110 to the Java source 112.

FIG. 16 shows a screenshot of a programmer selecting the reference to a Java method parameter 126 called "cardNumber" in order to navigate from the JSP source code 110 to the Java source code 112.

In response to the programmer selecting the Java method parameter 126, in accordance with the above described techniques, the database 22 is queried to determine the appropriate method of the Java source code 112, which is then highlighted and displayed to the programmer as indicated by reference numeral 128 in FIG. 17.

FIGS. 18 and 19 of the drawings show how embodiments of the invention provide real-time consistency analysis. In FIG. 18, shows the Java source code 112 after the getCardNumber method has been changed to getCreditCardNumber as indicated by the reference 130, thereby creating an inconsistency between the Java Source code 112 and the JSP source code 110 that references it. In one embodiment, an error message 132 is immediately displayed to alert a programmer to the fact that there is a JSP that references a method that has changed. FIG. 18 shows the error message 132 while the Java source code 112 is displayed, whereas FIG. 19 shows the error message 132 while the JSP source code is displayed.

Figure 20:
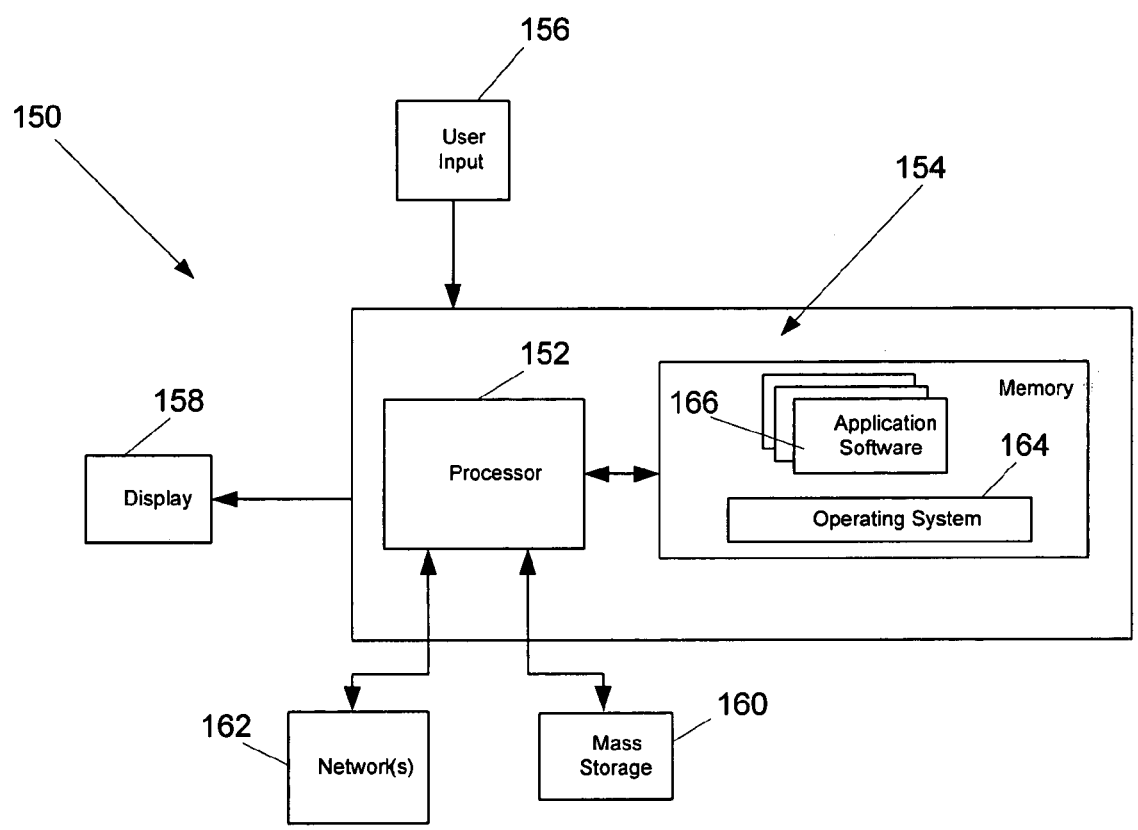
FIG. 20 shows an example of hardware that may be used to implement embodiments of the invention.

Referring to FIG. 20 of the drawings, reference numeral 150 generally indicates hardware that may be used to implement the IDE 30 or to perform any of the techniques described herein, in accordance with one embodiment. The hardware 150 typically includes at least one processor 152 coupled to a memory 154. The processor 152 may represent one or more processors (e.g., microprocessors), and the memory 154 may represent random access memory (RAM) devices comprising a main storage of the hardware 150, as well as any supplemental levels of memory e.g., cache memories, non-volatile or back-up memories (e.g. programmable or flash memories), read-only memories, etc. In addition, the memory 154 may be considered to include memory storage physically located elsewhere in the hardware 150, e.g. any cache memory in the processor 152, as well as any storage capacity used as a virtual memory, e.g., as stored on a mass storage device 160.

The hardware 150 also typically receives a number of inputs and outputs for communicating information externally. For interface with a user or operator, the hardware 150 may include one or more user input devices 156 (e.g., a keyboard, a mouse, etc.) and a display 158 (e.g., a Cathode Ray Tube (CRT) monitor, a Liquid Crystal Display (LCD) panel).

For additional storage, the hardware 150 may also include one or more mass storage devices 160, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 150 may include an interface with one or more networks 162 (e.g., a local area network (LAN), a wide area network (WAN), a wireless network, and/or the Internet among others) to permit the communication of information with other computers coupled to the networks. It should be appreciated that the hardware 150 typically includes suitable analog and/or digital interfaces between the processor 152 and each of the components 154, 156, 158 and 162 as is well known in the art.

The hardware 150 operates under the control of an operating system 164 and executes various computer software applications 166, components, programs, objects, modules, etc. (e.g. a program or module which performs operations described above). Moreover, various applications, components, programs, objects, etc. may also execute on one or more processors in another computer coupled to the hardware 150 via a network 162, e.g. in a distributed computing environment, whereby the processing required to implement the functions of a computer program may be allocated to multiple computers over a network. In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Although the present invention has been described with reference to specific exemplary embodiments, it will be evident that the various modifications and changes can be made to these embodiments without departing from the broader spirit of the invention as set forth in the claims. Accordingly, the specification and drawings are to be regarded in an illustrative sense rather than in a restrictive sense.

The invention claimed is:

1. A method of real-time analysis of artifacts in a software application, comprising:

collecting information about artifacts referenced by a file of the software application, wherein the information comprises, for each artifact, an artifact name, an artifact type, a parent artifact, an artifact pathname, artifact references and artifact dependencies;

for each artifact, generating an artifact record that includes the information and storing the artifact record in a database;

generating dependency information between the artifact records;

receiving user editing of a first artifact of the artifacts, wherein the editing changes the first artifact;

during the editing, performing a real-time consistency check to ensure consistency between the changed first artifact and all artifacts referenced by the first artifact based on the dependency information;

wherein the consistency check comprises checking for referencing errors between artifacts;

if an error is revealed based on the consistency check, displaying an error message to the user;

wherein if the editing comprises inputting one or more characters related to a referenced second artifact, querying the artifact records and displaying in real-time one or more selectable choices for the referenced second artifact based on the artifact records;

receiving a request to navigate to the second artifact, based on one of the one or more selectable choices, using a reference to the second artifact in the first artifact;

querying the artifact records in the database to retrieve a reference to the second artifact;

retrieving the second artifact using the reference to the second artifact; and displaying the second artifact in response to the request;

wherein the first artifact and the second artifact are implemented in different programming languages.

2. The method of claim 1, wherein the analysis includes a legal choice for an input given the artifact.

3. The method of claim 2, wherein a plurality of legal choices is presented in the form of a list from which a user can make a selection.

4. The method of claim 2, wherein the legal choice is used to automatically complete an editing input.

5. The method of claim 2, wherein the legal choice is displayed to a user in response to the user moving a pointing device to a particular area of a display screen.

6. A method of real-time analysis of artifacts in a software application, comprising:

collecting information about artifacts referenced by a statement in a first component of the application and storing the information in a database; wherein the first component is a source code of the application;

outputting run-time data for each artifact referenced by the statement to facilitate debugging of the first component, wherein the outputting is based on the information and the information comprises at least one of artifact name, parent artifact, artifact pathname, artifact references, or artifact dependencies;

performing a real-time consistency check to ensure consistency between the first component and all artifacts referenced by the first component, wherein the consistency check is performed in real-time as a user edits the first component;

wherein the consistency check comprises checking for referencing errors between artifacts;

if an error is revealed based on the consistency check, displaying an error message to the user;

wherein if the editing comprises inputting one or more characters related to a referenced artifact, querying the information and displaying in real-time one or more selectable choices for the referenced artifact based on the artifact records;

receiving a request to navigate to the artifact, based on one of the one or more selectable choices, using a reference to the artifact in the first component;

querying the information in the database to retrieve a reference to the artifact;

retrieving the artifact using the reference to the artifact; and displaying the artifact in response to the request;

wherein the first component and the referenced artifact are implemented in different programming languages.

7. The method of claim 6, wherein the artifacts include artifacts that are indirectly referenced by the statement.

8. The method of claim 6, wherein the artifacts include artifacts from a plurality of components of the application different from the first component.

9. The method of claim 6, further comprising performing the collecting for each statement in the first component.

10. A method of real-time analysis of artifacts in a software application, comprising:

for each component in the application collecting information about the artifacts that occur therein, wherein the component is a source code of the application, wherein the information comprises, for each artifact, an artifact name, an artifact type, a parent artifact, an artifact pathname, artifact references and artifact dependencies;

performing a consistency check to ensure consistency between the source code and the artifacts;

storing the information in a database;

wherein the consistency check is performed in real-time as a user edits the component, wherein the consistency check comprises checking for referencing errors between artifacts;

if an error is revealed based on the consistency check, displaying an error message to the user;

wherein if the editing comprises inputting one or more characters related to a referenced artifact, querying the information and displaying in real-time one or more selectable choices for the referenced artifact based on the artifact records;

receiving a request to navigate to the artifact, based on one of the one or more selectable choices, using a reference to the artifact in the component;

querying the information in the database to retrieve a reference to the artifact;

retrieving the artifact using the reference to the artifact; and displaying the artifact in response to the request;

wherein the component and the referenced artifact are implemented in different programming languages.

11. The method of claim 10, further comprising generating a user interface to allow a user to input code for a particular component; and providing guidance to the user to control said input to the extent that said input relates to an artifact stored in the database.

12. The method of claim 11, wherein said guidance comprises providing choices to constrain the input code based on information about an artifact to which the input code relates.

13. The method of claim 10, wherein said information comprises the name of an artifact, the methods of an artifact, and the attributes of an artifact.

14. A non-transitory computer readable medium, having stored thereon a sequence of code, which when executed by a processor, causes the processor to perform a method of real-time analysis of artifacts in a software application comprising:

collecting information about artifacts referenced by a file of the software application, wherein the information comprises, for each artifact, an artifact name, an artifact type, a parent artifact, an artifact pathname, artifact references and artifact dependencies;

for each artifact, generating an artifact record that includes the information and storing the artifact record in a database;

generating dependency information between the artifact records;

receiving user editing of a first artifact of the artifacts, wherein the editing changes the first artifact;

during the editing, performing a real-time consistency check to ensure consistency between the changed first artifact and the remaining artifacts based on the dependency information;

wherein the consistency check comprises checking for referencing errors between artifacts;

if an error is revealed based on the consistency check, displaying an error message to the user;

wherein if the editing comprises inputting one or more characters related to a referenced second artifact, querying the artifact records and displaying in real-time one or more selectable choices for the referenced second artifact based on the artifact records;

receiving a request to navigate to the second artifact, based on one of the one or more selectable choices, using a reference to the second artifact in the first artifact;

querying the artifact records in the database to retrieve a reference to the second artifact;

retrieving the second artifact using the reference to the second artifact; and displaying the second artifact in response to the request;

wherein the first artifact and the second artifact are implemented in different programming languages.

15. A system, comprising:

a processor; and a memory coupled to the processor, the memory storing instructions which when executed by the processor, cause the system to perform a method of real-time analysis of artifacts in a software application comprising:

collecting information about artifacts referenced by a file of the software application, wherein the information comprises, for each artifact, an artifact name, an artifact type, a parent artifact, an artifact pathname, artifact references and artifact dependencies;

for each artifact, generating an artifact record that includes the information and storing the artifact record in a database;

generating dependency information between the artifact records;

receiving user editing of a first artifact of the artifacts, wherein the editing changes the first artifact;

during the editing, performing a real-time consistency check to ensure consistency between the changed first artifact and the remaining artifacts based on the dependency information;

wherein the consistency check comprises checking for referencing errors between artifacts;

if an error is revealed based on the consistency check, displaying an error message to the user;

wherein if the editing comprises inputting one or more characters related to a referenced second artifact, querying the artifact records and displaying in real-time one or more selectable choices for the referenced second artifact based on the artifact records;

receiving a request to navigate to the second artifact, based on one of the one or more selectable choices, using a reference to the second artifact in the first artifact;

querying the artifact records in the database to retrieve a reference to the second artifact;

retrieving the second artifact using the reference to the second artifact; and displaying the second artifact in response to the request;

wherein the first artifact and the second artifact are implemented in different programming languages.

16. A method of real-time analyzing an application comprising a plurality of files, the method comprising:

determining a first file of the plurality of files to be managed;

collecting one or more artifacts that are related to the first file;

analyzing the one or more artifacts to determine artifact information for the artifacts, wherein the artifact information comprises at least one of artifact name, parent artifact, artifact pathname, artifact references, or artifact dependencies;

creating an artifact record comprising the artifact information and storing the artifact record in a database; and performing a real-time consistency check between the one or more artifacts and the application;

wherein the consistency check is performed in real-time as the application is being edited;

wherein the consistency check comprises checking for referencing errors between artifacts;

if an error is revealed based on the consistency check, displaying an error message to the user;

wherein if the editing comprises inputting one or more characters related to a referenced artifact, querying the artifact records and displaying in real-time one or more selectable choices for the referenced artifact based on the artifact records;

receiving a request to navigate to the artifact, based on one of the one or more selectable choices, using a reference to the artifact in the application;

querying the artifact records in the database to retrieve a reference to the artifact;

retrieving the artifact using the reference to the artifact; and displaying the artifact in response to the request;

wherein the application and the referenced artifact are implemented in different programming languages.

17. The method of claim 16, wherein a first artifact of the one or more artifacts is implemented in a first programming language, and a second artifact of the one or more artifacts is implemented in a second programming language that is different from the first programming language.

18. The method of claim 16, wherein the consistency check comprises determining whether the application references an undefined artifact.

* * * * *

UNITED STATES PATENT AND TRADEMARK OFFICE
CERTIFICATE OF CORRECTION

PATENT NO. : 8,010,946 B2  
APPLICATION NO. : 11/083644  
DATED : August 30, 2011  
INVENTOR(S) : Zaky et al.

Page 1 of 1

It is certified that error appears in the above-identified patent and that said Letters Patent is hereby corrected as shown below:

Title Pg, Item (56) in column 2, under "Other Publications", line 1, delete "Enginering" and insert -- Engineering --, therefor.

Title Pg, Item (56) in column 2, under "Other Publications", line 4, delete "Supportng" and insert -- Supporting --, therefor.

On Sheet 10 of 21, in FIG. 10, Box No. 90, line 2, delete "toe dit" and insert -- to edit --, therefor.

Signed and Sealed this
Twenty-ninth Day of November, 2011

David J. Kappos
*Director of the United States Patent and Trademark Office*